(12) United States Patent
Shin et al.

(10) Patent No.: US 11,819,154 B2
(45) Date of Patent: Nov. 21, 2023

(54) COMPRESSION CHAMBER FOR COMPRESSION TYPE RAMEN COOKER

(71) Applicants: Seung Hun Shin, Gyeonggi-do (KR); Se Yeol Choi, Gyeonggi-do (KR); Young Jin Lee, Seoul (KR)

(72) Inventors: Seung Hun Shin, Gyeonggi-do (KR); Se Yeol Choi, Gyeonggi-do (KR); Young Jin Lee, Seoul (KR)

( * ) Notice: Subject to any disclaimer, the term of this patent is extended or adjusted under 35 U.S.C. 154(b) by 0 days.

(21) Appl. No.: 17/927,255

(22) PCT Filed: Sep. 4, 2020

(86) PCT No.: PCT/KR2020/011921
§ 371 (c)(1),
(2) Date: Nov. 22, 2022

(87) PCT Pub. No.: WO2021/241807
PCT Pub. Date: Dec. 2, 2021

(65) Prior Publication Data
US 2023/0190029 A1   Jun. 22, 2023

(30) Foreign Application Priority Data
May 27, 2020   (KR) .................. 10-2020-0063525

(51) Int. Cl.
*A47J 27/08*      (2006.01)
*A47J 27/18*      (2006.01)
(Continued)

(52) U.S. Cl.
CPC ........... *A47J 27/0815* (2013.01); *A47J 27/04* (2013.01); *A47J 27/0802* (2013.01);
(Continued)

(58) Field of Classification Search
CPC ............ A47J 2027/008; A47J 2027/006; A47J 27/04; A47J 27/06; A47J 27/0815; A47J 27/092; A47J 27/16; A47J 27/18
See application file for complete search history.

(56) References Cited

FOREIGN PATENT DOCUMENTS

DE   102015221005 A1 *  4/2017  .............. A47J 27/04
JP   H06-304067 A     11/1994
(Continued)

OTHER PUBLICATIONS

International Search Report for PCT/KR2020/011921 dated Feb. 3, 2021.
(Continued)

*Primary Examiner* — Reginald Alexander
(74) *Attorney, Agent, or Firm* — The PL Law Group, PLLC (57) ABSTRACT

A compression chamber for a compression type ramen cooker is capable of cooking ramen by compression by blocking a discharge of air in a cooking container while cooking ramen. The compression chamber includes a lid, a chamber container having an upper portion on which the lid is mounted and a bottom surface to which the cooking container is coupled to seal the cooking container, a heater installed through the lid and mounted inside the chamber container to heat the water stored in the chamber container, a supply valve unit installed through the lid to supply water to the inside of the chamber container, a discharge valve unit installed through the lid to supply water in the chamber container to the cooking container, and a vapor discharge unit on a lower side of the chamber container to discharge compressed steam inside the cooking container.

5 Claims, 10 Drawing Sheets

(51) Int. Cl.
    *A47J 27/092*     (2006.01)
    *A47J 27/04*     (2006.01)
    *A47J 27/16*     (2006.01)
    *A47J 27/00*     (2006.01)

(52) U.S. Cl.
    CPC ............ *A47J 27/092* (2013.01); *A47J 27/16* (2013.01); *A47J 27/18* (2013.01); *A47J 2027/008* (2013.01)

(56) References Cited

FOREIGN PATENT DOCUMENTS

| KR | 10-1683085 A | 12/2016 | | |
|---|---|---|---|---|
| KR | 10-2017-0132648 A | 12/2017 | | |
| KR | 10-2019-0037813 A | 4/2019 | | |
| KR | 10-2019-0127182 A | 11/2019 | | |
| WO | WO-2018096193 A1 * | 5/2018 | .............. | A47J 27/04 |
| WO | WO-2018115696 A1 * | 6/2018 | ............ | A47J 27/004 |

OTHER PUBLICATIONS

Notice of Allowance dated Oct. 18, 2020 from Korean Patent Office in a counterpart Korean Patent Application No. 10-2020-0063525 (all the cited references are listed in this IDS.) (English translation is also submitted herewith.).

Office action dated Oct. 13, 2020 from Korean Patent Office in a counterpart Korean Patent Application No. 10-2020-0063525 (all the cited references are listed in this IDS.) (English translation is also submitted herewith.).

* cited by examiner

COMPRESSION CHAMBER FOR COMPRESSION TYPE RAMEN COOKER

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/011921, filed Sep. 04, 2020, which claims priority to the benefit of Korean Patent Application No. filed in the Korean Intellectual Property Office on May 27, 2020, the entire contents of which are incorporated herein by reference.

BACKGROUND

1. Technical Field

The present invention relates to a compression chamber for compression type ramen cooker, and more particularly, relates to the compression chamber for a compression type ramen cooker that enables rapid cooking of ramen by using a compression chamber coupled to the cooking container, heating the cooking container using a heater in a compressed state, and pre-heating the water in the compression chamber.

2. Background Art

As the modern life shifts to a five-day work per a week, people's leisure activities are gradually increasing. As leisure activities gradually increase, each local government is providing a variety of resting spaces in outdoor parks, playgrounds, or terrace lands on the river. Accordingly, people are gradually increasing their outdoor activities in family units or club units.

In addition, lunchboxes are accompanied by various outdoor activities, but since it is inconvenient to prepare a lunchbox, they usually prefer ramen that can be quickly cooked and eaten at convenience stores as a simple snack or meal replacement.

If you eat ramen, you buy cup noodles at a convenience store, etc., put water heated at a high temperature into a cup noodles container, and eat ramen after a certain period of time. Cup noodles are not good for the human body because they use a polymer container. Accordingly, an instant ramen cooker that can replace cup noodles was released, and the instant ramen cooker puts ramen and water in an aluminum foil case and boils it. However, the conventional instant noodle cooker uses a coil-shaped heater as a heating mechanism. When using the coiled-shaped heater, since the printed circuit board for operating the heater is installed close to the heating device, when water overflows during cooking, there are problems that water which is overflowed during cooking can enter the inside of the heater device, and accordingly, the water in the heating device causes the wiring or the board of the heating device to be disconnected or damaged due to a short circuit.

In addition, there is a problem in the conventional ramen cooker that since the water storage tank and electrical parts are not perfectly isolated and water vapor is always generated in the water storage tank, steam spreads inside the ramen cooker and all electrical parts are corroded or short circuited.

In addition, there is a problem in the conventional ramen cooker that it takes a lot of time because the cooker uses a heating coil and boils water under normal atmospheric pressure to cook the ramen.

In order to solve these problems, a compression type ramen cooker has been released, but the problem of the compression type ramen cooker is that a separate compression container is required for compression and it is not easy to handle the compressed container. In addition, there has been released that a compression type ramen cooker embodies a compressed container, but there is a problem that the compression type ramen cooker has a heater integrally formed at the bottom of the compressed container. In addition, since it is a method of compressing by supplying steam rather than preheating water in a compressed container, there is a problem that it takes much time to cook the ramen.

SUMMARY

The present invention is contrived to solve the above problems, and an object of the present invention is to provide a compression chamber for a compression-type ramen cooker capable of heating water in advance to use a compression chamber coupled to the cooking container and discharging the compressed air inside the cooking container through the compression chamber.

Another object of the present invention is to provide a compression chamber for a compression type ramen cooker having a heater in the compression chamber to heat water in advance in the compression chamber and supply the heated water to the cooking container.

Another object of the present invention is to provide a compression chamber for a compression type ramen cooker capable of controlling the level and temperature of water introduced into the compression chamber.

In order to achieve the above object, the present invention provides a compression chamber for a compression type ramen cooker capable of cooking ramen by compression by blocking the discharge of air in the cooking container while cooking ramen put into the cooking container in combination with a cooking container, wherein the compression chamber including: a lid; a chamber container which the lid is mounted on the upper portion and cooking container is coupled to the bottom surface to seal the cooking container; a heater installed through the lid and mounted inside the chamber container to heat the water stored in the chamber container; a supply valve unit installed through the lid to supply water to the inside of the chamber container; a discharge valve unit installed through the lid to supply water in the chamber container to the cooking container; and a vapor discharge unit installed on a lower side of the chamber container to discharge compressed steam inside the cooking container.

In the present invention, the compression chamber further includes: a temperature sensor installed on the lid and extended into the chamber container to measure the temperature of water inside the chamber container; and a water level sensor installed on the lid and extended into the chamber container to measure the water level inside the chamber container.

In the present invention, the supply valve unit includes: a supply joint mounted on the lid; and a solenoid valve connected to the supply joint to supply and block water.

In the present invention, the discharge valve unit includes: a rod valve moving up and down through the lid and the chamber container; a gear engaged with a gear groove formed on the circumferential surface of the rod valve to drive the rod valve up and down; and a driving motor for driving the gear.

In the present invention, the steam discharge unit includes: a steam outlet formed through the bottom surface of the chamber container and formed to protrude to the lower side of the chamber container; a joint installed at the steam outlet; a vapor discharge tube connected to the joint; and a solenoid valve mounted on the steam discharge tube to open or block discharge of compressed steam through the steam discharge tube.

According to the compression chamber for a compression ramen cooker of the present invention, there are advantages that can reduce cooking time because water can be heated in advance by using a compression chamber coupled to the cooking container and compressed air inside the cooking container can be discharged through the compression chamber.

In addition, the present invention has the advantage of providing a heater inside the compression chamber to heat water in advance in the compression chamber and supply the heated water to the cooking container.

In addition, the present invention has the advantage of being able to adjust the water level and temperature of the water introduced into the compression chamber.

DETAILED DESCRIPTION

The best modes of embodiments of the present invention includes: a compression chamber for a compression type ramen cooker capable of cooking ramen by compression by blocking the discharge of air in the cooking container while cooking ramen put into the cooking container in combination with a cooking container, wherein the compression chamber including: a lid; a chamber container which the lid is mounted on the upper portion and cooking container is coupled to the bottom surface to seal the cooking container; a heater installed through the lid and mounted inside the chamber container to heat the water stored in the chamber container; a supply valve unit installed through the lid to supply water to the inside of the chamber container; a discharge valve unit installed through the lid to supply water in the chamber container to the cooking container; and a vapor discharge unit installed on a lower side of the chamber container to discharge compressed steam inside the cooking container.

Hereinafter, preferred embodiments of the present invention will be described in detail with reference to the accompanying drawings. However, this is intended to describe in detail enough that a person of ordinary skill in the art to which the present invention pertains can easily implement the invention, and this does not mean that the technical spirit and scope of the present invention are limited thereto.

Figure 1:
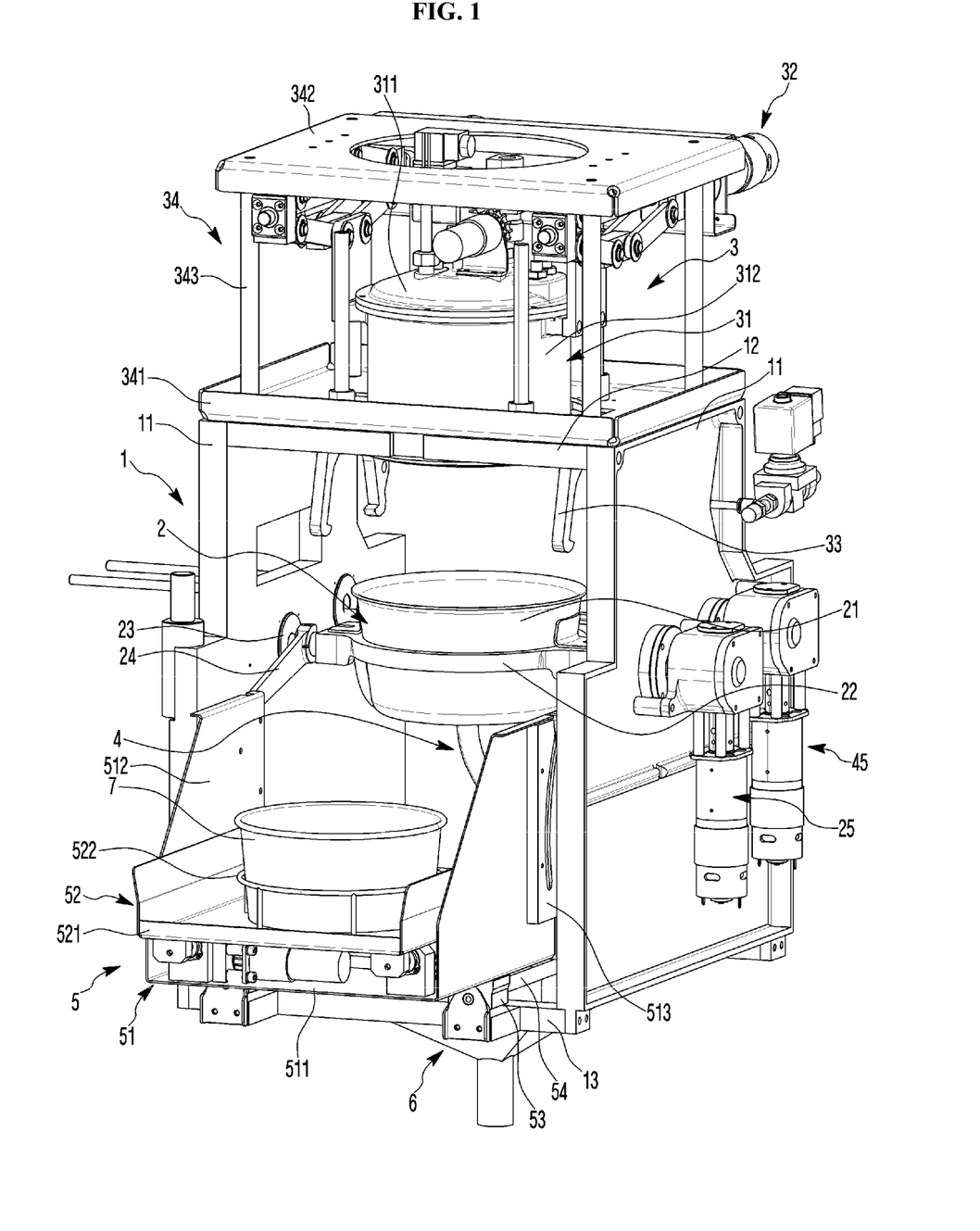
FIG. 1 is a perspective view of the compression type ramen cooker according to the present invention.
Figure 2:
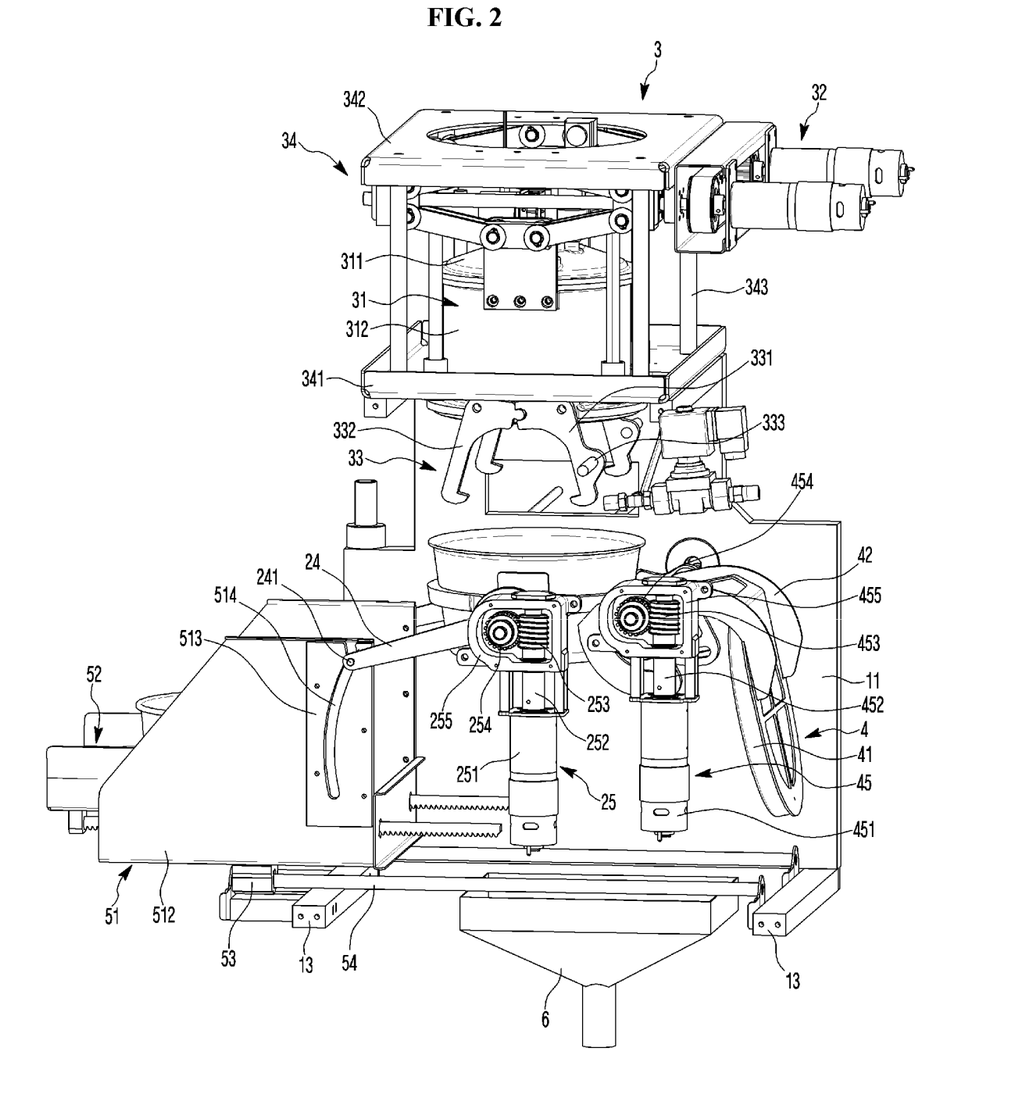
FIG. 2 is a perspective view of a state in which the side plate of one side is removed from the compression type ramen cooker according to the present invention.
Figure 3:
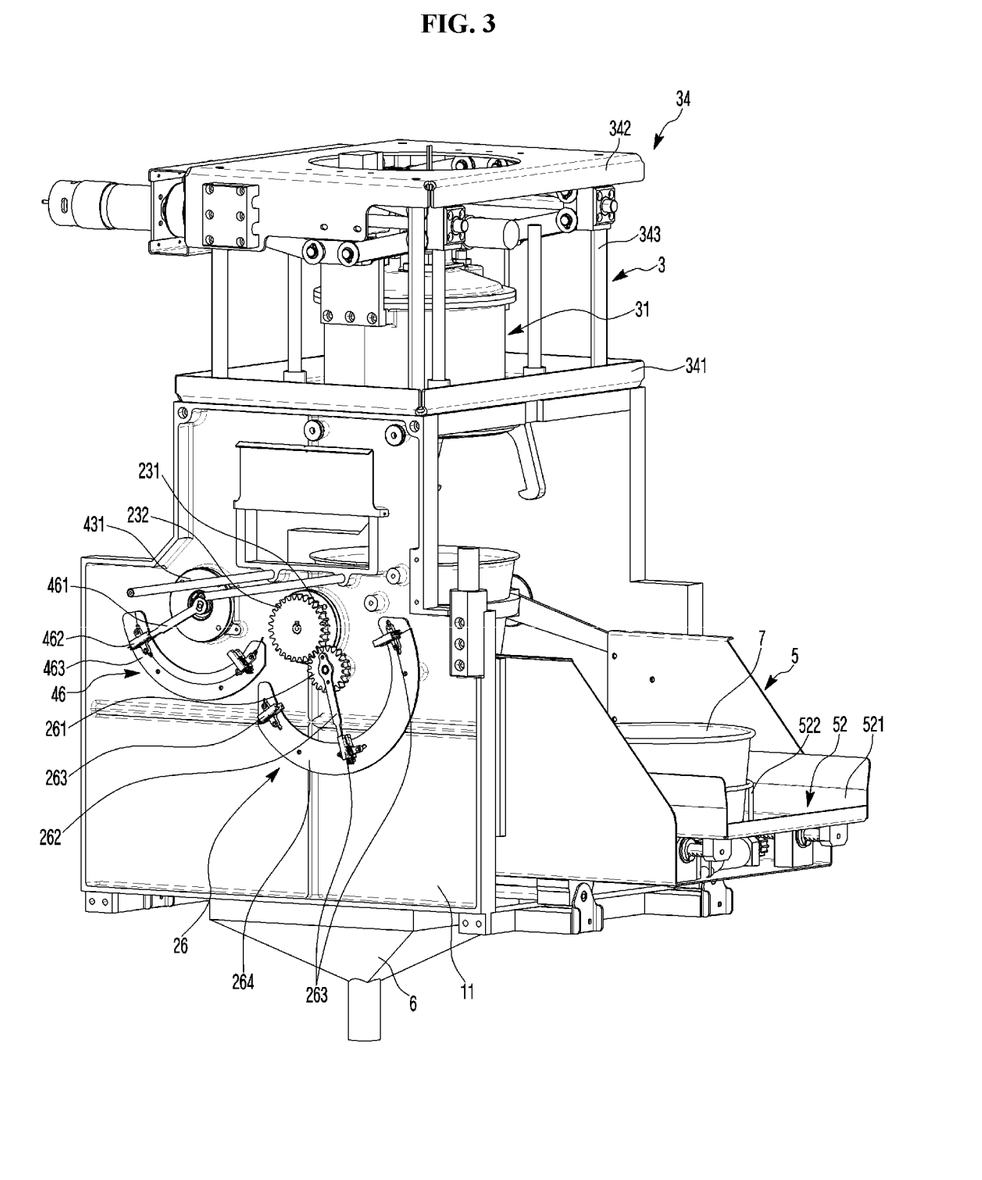
FIG. 3 is a side perspective view of the compression type ramen cooker according to the present invention.
Figure 4:
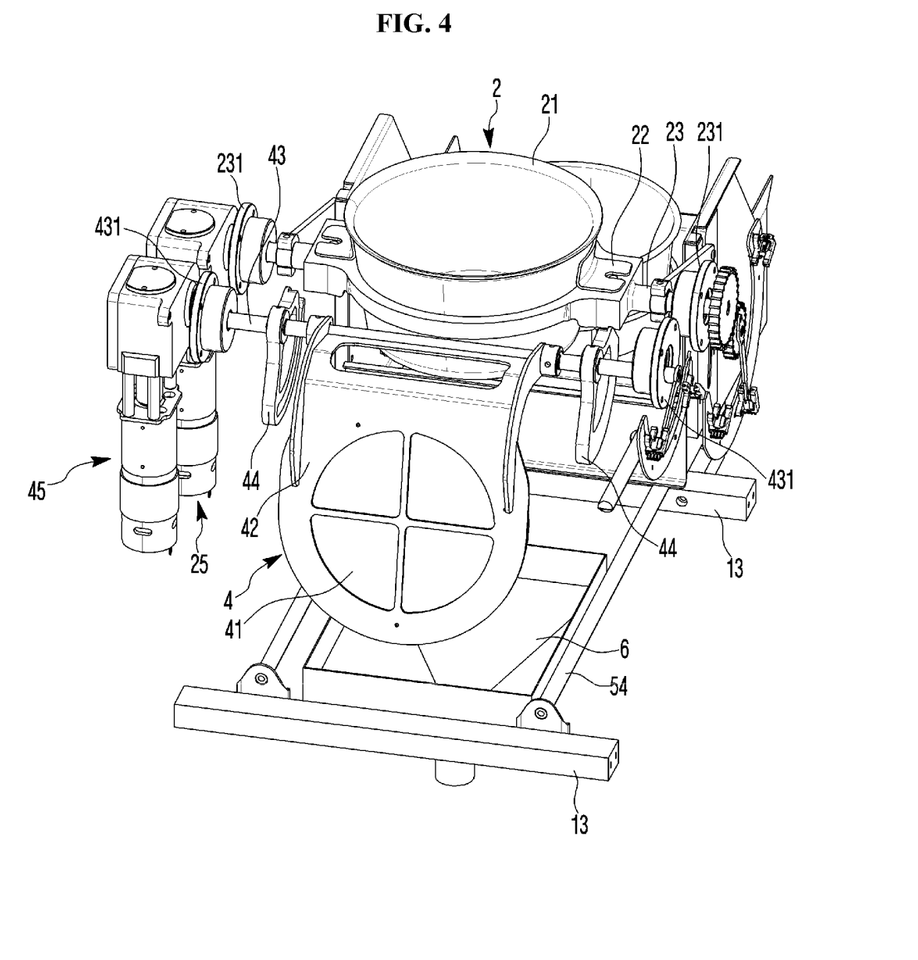
FIG. 4 is a perspective view of a cooking container and an induction heater of the compression type ramen cooker according to the present invention.
Figure 5:
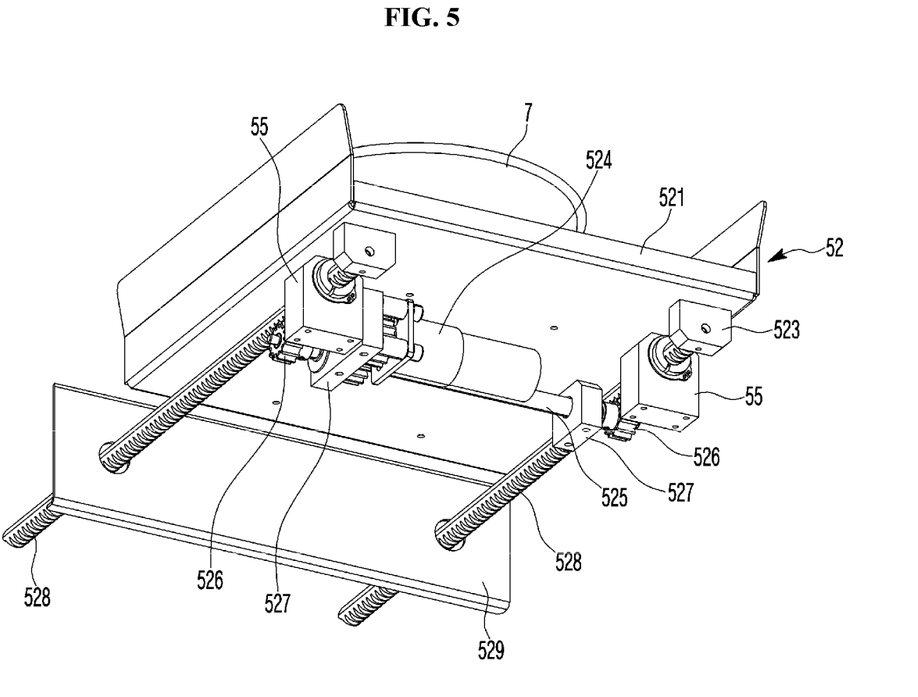
FIG. 5 is a perspective view of a ramen discharging part of the compression type ramen cooker according to the present invention.
Figure 6:
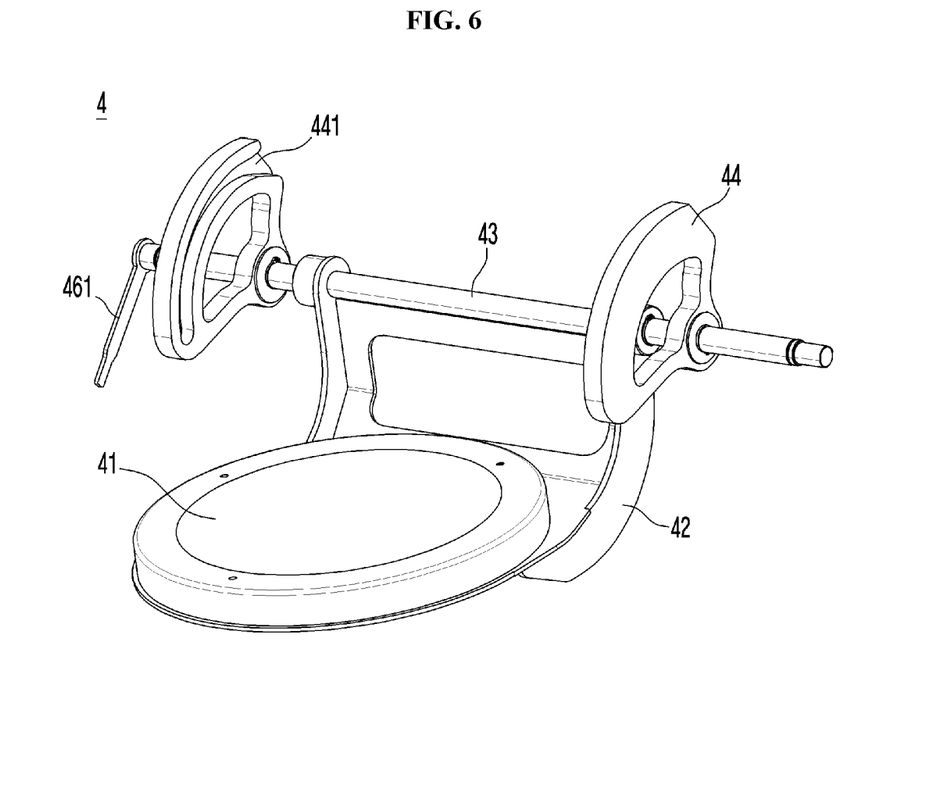
FIG. 6 is a perspective view of the induction heater of the compression type ramen cooker according to the present invention.
Figure 7:
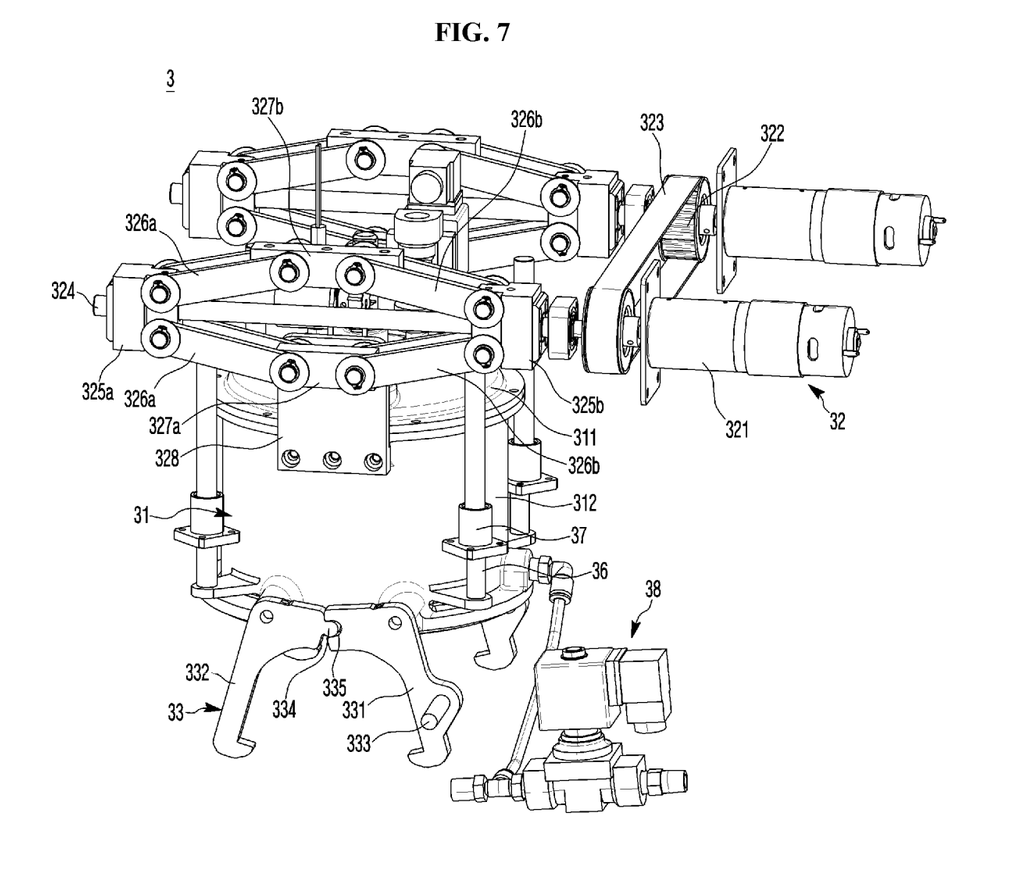
FIG. 7 is a perspective view of the compression chamber of the compression type ramen cooker according to the present invention.
Figure 8:
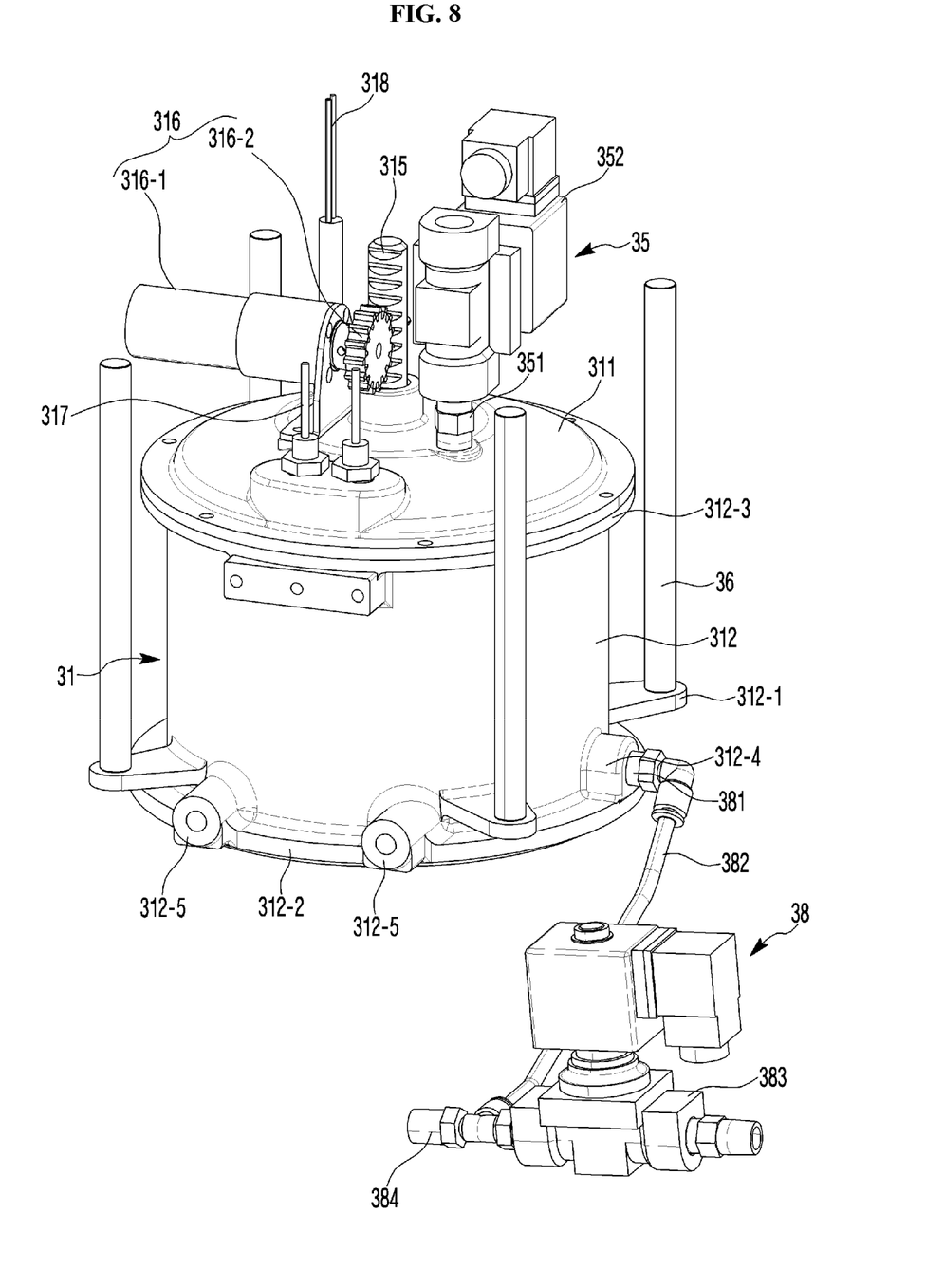
FIG. 8 is a perspective view of the compression chamber of the compression chamber of FIG. 7.
Figure 9:
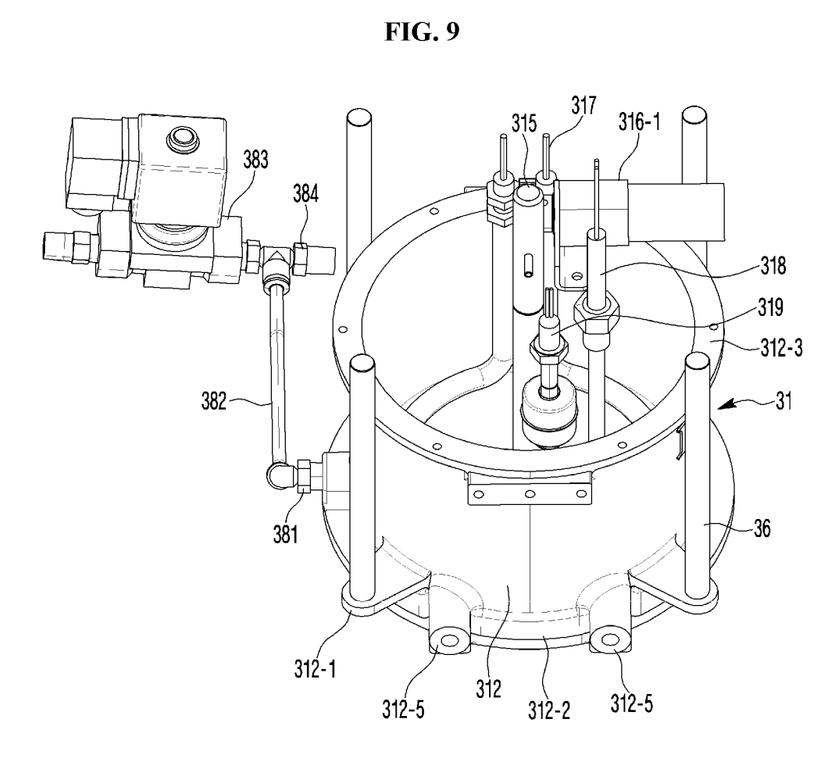
FIG. 9 is a partial perspective view of the compression chamber of the compression chamber of FIG. 7.
Figure 10:
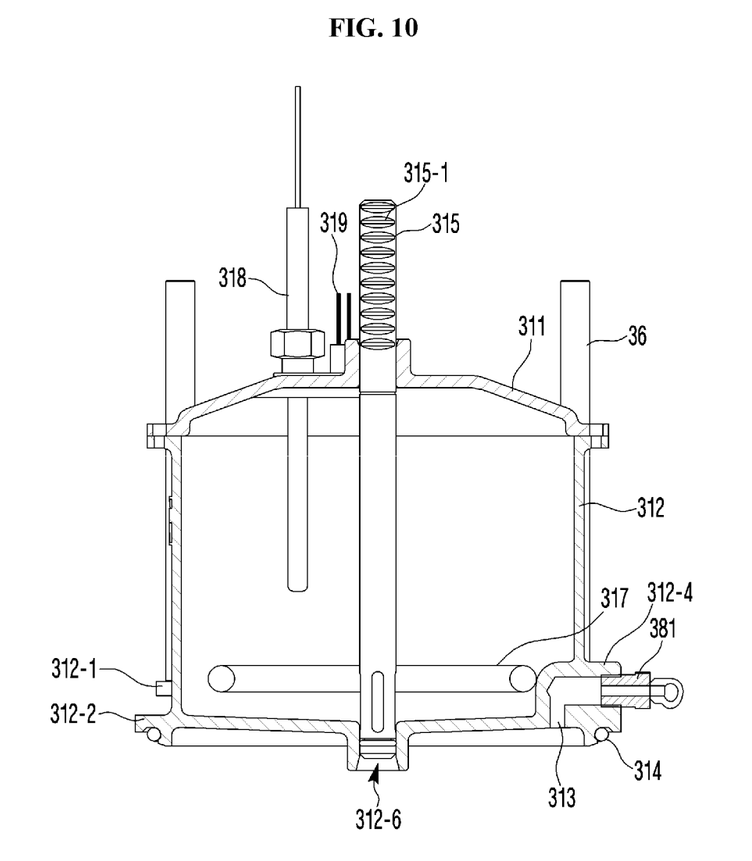
FIG. 10 is a cross-sectional view of the compression chamber of the compression chamber of FIG. 7.

FIG. 1 is a perspective view of the compression type ramen cooker using induction heater according to the present invention, and FIG. 2 is a perspective view of a state in which the side plate of one side is removed from the compression type ramen cooker using induction heater according to the present invention, and FIG. 3 is a side perspective view of the compression type ramen cooker using induction heater according to the present invention, and FIG. 4 is a perspective view of a cooking container and an induction heater of the compression type ramen cooker using induction heater according to the present invention, and FIG. 5 is a perspective view of a ramen discharging part of the compression type ramen cooker using induction heater according to the present invention, and FIG. 6 is a perspective view of the induction heater of the compression type ramen cooker using induction heater according to the present invention, and FIG. 7 is a perspective view of the compression chamber of the compression type ramen cooker using induction heater according to the present invention, and FIG. 8 is a perspective view of the compression chamber of the compression chamber of FIG. 7, and FIG. 9 is a partial perspective view of the compression chamber of the compression chamber of FIG. 7, and FIG. 10 is a cross-sectional view of the compression chamber of the compression chamber of FIG. 7.

FIG. 1 to FIG. 3 show a compression type ramen cooker using an induction heater according to the present invention. As shown in FIG. 1, the compression type ramen cooker using an induction heater according to the present invention is composed of a main frame 1, a cooking container 2 mounted on the main frame, a compression chamber 3 to compress cooking container 21 combined with compression chamber 3, an induction heater 4 applying a heat source from the lower part of the cooking container 2, a ramen discharging part 5 discharging the ramen cooked in the cooking container 2, and a drain 6 for washing the inner side of the cooking container after ramen is cooked and discarding the washed water. The ramen cooked by this compression cooker is put into the disposable ramen container 7. Hereinafter, each configuration will be described in detail with reference to the drawings.

As shown in FIG. 1, the main frame 1 consists of a side plate 11 formed on both sides, an upper plate 12 connecting the upper portions of the side plate 11, a lower main bar 13 connecting the lower portion of the side plate 11, and an upper main bar 12 connecting the upper portion of side plate 11. The support frame 34 is fixedly mounted on the upper portion of the upper main bar 12 and the side plate 11.

As shown in FIG. 1 and FIG. 3, the cooking container 2 consists of a cooking container 21, a container fixture 22 into which the cooking container 21 is inserted and fixed, a rotating shaft 23 connected to both sides of the container fixture 22, a motor unit for driving the rotating shaft 23 to be connected to one side of the rotating shaft 23, a sensor unit 26 connected to the other side of rotating shaft 23 for controlling the rotation of the rotating shaft 23, and a rotating link 24 for driving the ramen discharging part 5 forward and backward in the rotating shaft 23. The motor unit 25 is fixedly mounted on the outside of the one side of the side plate 11, and the motor unit 25 composes a driving motor 251, a driving motor shaft 252, a shaft 253 formed on the upper portion of the driving motor shaft 252, a worm gear 254 engaged with the shaft 253, and a gear groove 255 covering the shaft 253 and the worm gear 254. The worm gear 254 is equipped with a rotating shaft 23 so that the rotating shaft 23 is rotated according to the rotation of the worm gear 254, and the rotating shaft 23 is connected to the container fixture 22, and the cooking container 21 mounted on the container fixture 22 is rotated by the rotation of the driving motor 251. By the rotation of cooking container 21, the ramen cooked in the cooking container 21 may be put into the ramen container 7, and the wash water of the cooking container 21 may be discharged to the drain 6. A sensor unit 26 is provided on the outside of the other side of the side plate 11. The sensor unit 26 includes a sensing gear 261 connected to the gear 232 which is mounted on the end of the rotating shaft 23 and rotated outside of the other side of the side plate 11, a sensing bar 262 rotating together with the sensing gear 261, a cylindrical bar 264 on which a sensor 263 for detecting the rotation of the sensing bar 262 is mounted, and a sensor 263 for detecting the rotation of the sensing bar 262 which is mounted on the predetermined position of the cylindrical bar 264. Therefore, according to the rotation of the driving motor 251, the cooking container 21 rotates toward the ramen container 7 to discharge the cooked ramen, and rotates to the opposite side to discard the wash water of the cooking container 21 to the drain 6. Bearing units 231 are mounted on both sides of the rotating shaft 23, and the bearing units 231 are fixed to the side plate 11.

As shown in FIG. 1 and FIG. 7, the compression chamber 3 includes a chamber container unit 31, a vertical driving unit 32 for moving the chamber container unit 31 up and down, a fastening hook 33 coupled to the container fixture so that the chamber container unit 31 can seal and compress the cooking container 21 , a support frame 34 on which the vertical driving unit 32 is mounted, a supply valve unit 35 for supplying water to the chamber container unit 31, a chamber container guide rod 36 for guiding the vertical movement of the chamber container unit 31, a chamber container guide 37 for guiding the chamber container guide rod 36 to move up and down, and a steam discharge unit 38 for discharging compressed air in the cooking container 21. Specifically, the chamber container unit 31 includes a lid 311 and a chamber container 312 to which the lid 311 is fixed and the bottom surface is coupled to the cooking container 21 to seal the cooking container 21. The vertical driving unit 32 is connected to both upper sides of the chamber container unit 31 to move the chamber container unit 31 up and down. The fastening hooks 33 are mounted on both lower sides of the chamber container unit 31 and are coupled to the container fixture 22 of the cooking container 21 according to the rotation of the induction heater 4. The support frame 34 includes a lower support plate 341 mounted on the upper main bar 12, a support bar 343 mounted on a corner of the lower support plate 341, and a upper support plate 342 mounted on the upper portion of the support bar 343. The chamber container guide 37 is fixed to the lower support plate 341, and the chamber container guide rod 36 moving up and down by the driving of the vertical driving unit 32 is able to move up and down in fixed position by the chamber container guide 37 fixedly mounted to the lower support plate 341.

The compression chamber 3 will be described in more detail with reference to FIGS. 7 to 10. As shown in the figure, the chamber container unit 31 is connected to the vertical driving unit 32. The vertical driving unit 32 includes a driving motor 321, a rotating shaft 324 rotated by the driving motor 321 and threaded on the outer circumferential surface, one side thread guide 325a and the other side thread guide 325b that move forward and backward by the threads formed on the rotating shaft 324 as the rotating shaft 324 rotates, One side link 326a connected to the one side thread guide 325a and the other side link 326b connected to the other side thread guide 325b, a central link 327a to connect the one side link 326a and the other side link 326b each other, a central link fixing plate 328 to which the central link 327a is fixed, and a belt pulley 322 mounted on one side of the driving motor 321 to transmit rotational force. The links may be formed vertically. When formed vertically, the links composed of one side link 326a, the other side link 326b and the central link 327a of the lower side, and one side link 326a, the other side link 326b and the central link 327b of the upper side. The upper central link 327b is fixed to the upper support plate 342. Accordingly, as the rotating shaft 324 rotates, the chamber container unit 31 descends down. The driving motor 321 is formed in a pair, and the belt pulley 322 is also formed in a pair. When one side of the driving motor 321 is driven, the other side does not operate, and when the other side is driven, one side does not operate. Accordingly, the one side belt pulley 322 transmits the rotational force through the belt 323 to the other side belt pulley, and by the rotation of the rotational shaft 324 which the rotational force is transmitted, it is possible to move the forward and backward movement of the one side thread guide and the other side thread guide. The chamber container unit 31 includes a lid 311, a chamber container 312 to which the lid 311 is coupled, a steam discharge hole 313 formed on the lower side of the chamber container 312, a packing ring 314 for sealing the container when combined with the cooking container 21 to the lower side of the chamber container 312, a bar-type rod valve 315 for opening or closing the water discharge hole 312-6 formed in the center of the chamber container 312 to supply water to the cooking container 21, a valve driving unit 316 mounted on the lid 311 to supply or block water while driving the rod valve 315 up and down, a wire heater 317 for heating the water in the chamber container 312 connected to the inside of the chamber container 312 through the lid 311, a temperature sensor 318 for measuring the temperature of the water inside the chamber container 312, and a floating sensor 319 for measuring the water level in the chamber container 312. In addition, a supply valve 35 is connected to the lid 311 for supplying water to the chamber container 312 through the lid 311. In addition, a steam discharge unit 38 connected to the compressed steam discharge hole 313 is further provided to discharge the compressed air in the cooking container 21. In the case of the rod valve 315, a pipe (not drawn) passing through the rod valve is formed in order to wash the cooking container 21, and by providing a nozzle (not drawn) at the lower end, the residue remaining inside the cooking container 21 may be washed using water sprayed from the nozzle.

The chamber container 312 consists of a upper flange 312-3 connected to the lid 311, a guide rod support plate 312-1 formed on the outer lower part of the chamber container 312 to which the guide rod is connected, a lower flange 312-2 for sealing the cooking container 21, a steam discharge connector 312-4 to which the steam discharge unit 38 is connected, and a fastening hook mounting hole 312-5 mounted on the fastening hook 33. A wire heater 317 is mounted in the chamber container 312 and heats the water in the chamber container 312. A steam discharge hole 313 is provided inside the steam discharge connector 312-4, so that the compressed steam inside the cooking container 21 can be discharged to the outside.

The fastening hook 33 is mounted on a pair of fastening hook mounting holes 312-5 formed on the lower side of the chamber container 312, and one side fastening hook 331 and the other side fastening hook 332 are rotatably fixed to each the fastening hook mounting hole 312-5. A guide protrusion 333 is further formed on the one side fastening hook 331 to be mounted on the container fixture 22 while moving along the arc-shaped guide groove 441 of the rotation guide 44. The one-side fastening hook 331 and the other-side fastening hook 332 are jointed to each other at the top so that they can move opposite together, and the articular protrusion 334 and the articular protrusion groove 335 is formed. An articular protrusion groove 335 is formed in the one-side fastening hook 331, and an articular protrusion 334 is formed in the other-side fastening hook 332. The articular protrusion 334 and the articular protrusion groove 335 are made in a circular shape, and the guide protrusion 333 of the one-side fastening hook 331 moves along the arc-shaped guide groove 441 of the rotation guide 44. As the rotation shaft 43 rotates, the rotation guide 44 mounted on the rotation shaft 43 is rotated together, accordingly the guide protrusion 333 is pushed toward the container fixture 22, and when the one-side fastening hook 331 is pushed toward the container fixture 22, the articular protrusion groove 335 is also directed upward, and as a result, the articular protrusion 334 positioned in the articular protrusion groove 335 also moves upward, and the other-side fastening hook 332 is also pushed toward the container fixture 22, and accordingly the lower flange 312-2 of the chamber container 312 contacts closely with the upper end of the cooking container 21. A packing ring 314 is provided on the lower flange 312-2 to improve sealing.

The supply valve unit 35 includes a supply pipe 351 connected to the lid 311 and a solenoid valve 352 connected to the supply pipe 351 to supply or block water to the supply pipe 351. A supply line (not drawn) for supplying water is connected to the solenoid valve 352.

The valve driving unit 316 for driving the rod valve 315 includes a gear 316-2 to move the rod valve 315 up and down interlocked with a gear groove formed at the upper end of the rod valve 315 and a motor 316-1 to which the gear 316-2 is mounted.

A steam discharge unit 38 includes a joint 381 connected to a steam discharge connector 312-4 in which a steam discharge hole 313 is formed, and a steam discharge tube 382 connected to the joint 381, and a solenoid valve 383 connected to the tube for opening and closing the tube, and an outlet 384 through which compressed steam is discharged by the solenoid valve 383. When cooking is completed in the cooking container 21, the compressed steam is discharged through the steam discharge hole 313, and the compressed steam is discharged to the outside by opening the solenoid valve 383.

As shown in FIG. 2, FIG. 3, and FIG. 6, the induction heater 4 includes an induction heater 41 in contact with the underside of the cooking container 21, a support link 42 which one-side fix and support the induction heater 41 and the other-side is connected to the rotation shaft 43, a rotation shaft 43 to which the other-side of the support link 42 is fixed, a rotation guide 44 for mounting or detaching the fastening hook 33 to the container fixture 22 by guiding the forward and backward movement of the fastening hook 33 while being fixed to the rotary shaft 43 and rotating together with the rotation shaft 43, a motor 45 for rotating the rotation shaft 43, and a sensor unit 46 for controlling the rotation angle of the induction heater 41. Bearing parts 431 are mounted on both sides of the rotation shaft 43, and the bearing parts 431 are fixed to the side plate 12. In addition, the sensor unit 46 formed on the other-side of the rotation shaft 43 includes a sensing bar 461 that is mounted on the other-end of the rotation shaft 43 and rotates together with the rotation shaft 43, a sensor 462 for detecting the rotation of the sensing bar 461, and an arc-shaped bar 463 on which the sensor 462 is mounted. The sensing bar 461 rotates together with the rotation shaft 43 and the rotation angle is fixed by the sensor 462. As shown in FIG. 6, the rotation guide 44 has an arc-shaped guide groove 441 formed thereon, and the rotation guide moves the guide protrusion 333 of the one-side fastening hook 331 forward and backward through the arc-shaped guide groove 441 which the inlet is open and the end is closed. That is, the guide protrusion 333 of the one-side fastening hook 331 enters the inlet side, and as it progresses toward the end-side of the guide groove 441, the guide protrusion 333 moves toward the container fixture 22.

As shown in FIG. 1 to FIG. 3 and FIG. 5, the ramen discharging part 5 includes a discharge frame 51, a container discharge unit 52 mounted on the upper portion of the discharge frame, a discharge guide 53 mounted on the underside of the discharge frame 51, and a guide bar 54 for guiding the forward and backward movement of the discharge guide 53. The discharge frame 51 is composed of a base plate 511 and a side base plate 512 extending upward from both sides of the base plate 511, and a guide plate 513 to which a guide groove 514 is further attached to the side base plate 512. The container discharge unit 52 is provided on the upper portion of the base plate 511, and the discharge guide 53 for the front and rear movement of the discharge frame 51 is mounted on the underside of the base plate 511, and the guide bar 54 is mounted on the lower main bar 13 so that the discharge frame 51 may move forward and backward. The discharge frame 51 can move forward and backward as the rotation link 24 moves up and down along the guide groove 514 formed in a predetermined track on the guide plate 513.

A drain 6 is mounted on the lower main bar 13, and after being cooked in the cooking container 21, the washing water for washing the cooking container 21 is discharged.

As shown in FIG. 1 and FIG. 5, the container discharge unit 52 includes a ramen container support plate 521, a ramen container holder 522 attached to the ramen container support plate 521, a pair of guide bars 528 mounted on the underside of the ramen container support plate 521, a guide bar fixing member 523 for fixing the guide bar 528 to the underside of the ramen container support plate 521, a drive motor 524 for moving the guide bar 528 forward and backward, a gear shaft 525 receiving the rotational force of the drive motor 524, a pair of driving gears 526 mounted on both ends of the gear shaft 525 for moving the guide bar 528 forward and backward to be engaged with grooves formed in the guide bar 528, a gear shaft support part 527 fixedly mounted on the base plate 511 while supporting the driving gear 526, and a water droplet entry prevention plate 529 for preventing water droplets from entering the inside when discarding the washing water of the cooking container 21. The front of the guide bar 528 is fixed to the guide bar fixing member 523 and moves forward and backward along the container discharge guide 55. The container discharge guide 55 is fixed to the base plate 511.

As described above, the compression type ramen cooker using the induction heater according to the present invention has an advantage that the cooking time is shortened because the water is heated in the compression chamber 3 and the heated water is put into the cooking container 21. In addition, since the induction heater 41 is used, there is an advantage in that the risk of fire due to overheating can be prevented. In addition, after the ramen is cooked, it is automatically discharged to the ramen container 7, and the user only needs to take the ramen container 7, and since the cooking container 21 can be washed with the heated water of the chamber container unit 31 of the compression chamber 3, it has the advantage of being able to block microorganisms such as germs or bacteria etc.

As described above, the present disclosure can be made in various modifications, and preferred embodiments of the present disclosure have been described, but the present disclosure is not limited to these embodiments. In the claims and the detailed description of the present disclosure, it will be appreciated that the techniques that can be modified and used by those skilled in the art are included in the scope of the present disclosure. The present invention relates to a compression-type ramen cooker using an induction heater, and by heating the induction heater in a compressed state using a compression-type cooking container, the ramen can be cooked quickly, so that it can be quickly enjoyed indoors or outdoors.

What is claimed is:

1. A compression chamber for a compression type ramen cooker, the compression chamber in combination with a cooking container capable of cooking ramen by compression by blocking a discharge of air in the cooking container while cooking the ramen put into the cooking container, the compression chamber comprising:
    a lid;
    a chamber container having an upper portion on which the lid is mounted and a bottom surface to which the cooking container is coupled to seal the cooking container;
    a heater installed through the lid and mounted inside the chamber container to heat the water stored in the chamber container;
    a supply valve unit installed through the lid to supply water to the inside of the chamber container;
    a discharge valve unit installed through the lid to supply water in the chamber container to the cooking container; and
    a vapor discharge unit installed on a lower side of the chamber container to discharge compressed steam inside the cooking container.

2. The compression chamber of claim 1 further comprising:
    a temperature sensor installed on the lid and extended into the chamber container to measure the temperature of water inside the chamber container; and
    a water level sensor installed on the lid and extended into the chamber container to measure the water level inside the chamber container.

3. The compression chamber of claim 1, wherein the supply valve unit comprises:
    a supply joint mounted on the lid; and
    a solenoid valve connected to the supply joint to supply and block water.

4. The compression chamber of claim 1, wherein the discharge valve unit comprises:
    a rod valve moving up and down through the lid and the chamber container;
    a gear engaged with a gear groove formed on the circumferential surface of the rod valve to drive the rod valve up and down; and
    a driving motor for driving the gear.

5. The compression type ramen cooker of claim 1, wherein the steam discharge unit comprises:
    a steam outlet formed through the bottom surface of the chamber container and formed to protrude to the lower side of the chamber container;
    a joint installed at the steam outlet;
    a vapor discharge tube connected to the joint; and
    a solenoid valve mounted on the steam discharge tube to open or block discharge of compressed steam through the steam discharge tube.

* * * * *